(12) United States Patent
Fredman

(10) Patent No.: US 6,526,393 B1
(45) Date of Patent: Feb. 25, 2003

(54) TIME CONTROLLED PRE-PAID DELIVERY

(76) Inventor: Robert Alan Fredman, 7620 Old Georgetown Rd. #108, Bethesda, MD (US) 20814

( * ) Notice: Subject to any disclaimer, the term of this patent is extended or adjusted under 35 U.S.C. 154(b) by 0 days.

(21) Appl. No.: 09/451,427

(22) Filed: Nov. 30, 1999

(51) Int. Cl.[7] .............................................. G06F 17/60
(52) U.S. Cl. ....................................... 705/408; 101/91
(58) Field of Search ................................ 705/408, 410; 101/91

(56) References Cited

U.S. PATENT DOCUMENTS

| | | | | |
|---|---|---|---|---|
| 5,053,995 A | * | 10/1991 | Peach et al. ................. | 364/401 |
| 5,566,981 A | * | 10/1996 | Alcordo ....................... | 283/53 |
| 5,791,991 A | * | 8/1998 | Small .......................... | 463/40 |
| 5,801,634 A | * | 9/1998 | Kara et al. .................... | 705/408 |
| 5,822,735 A | * | 10/1998 | De Lapa et al. .............. | 705/14 |
| 6,415,054 B1 | * | 7/2002 | Silverbrook et al. ......... | 382/233 |

FOREIGN PATENT DOCUMENTS

WO     WO 95/03979    *   2/1995

OTHER PUBLICATIONS no author; USPS Approves Stamp.com NetStamps Beta; Oct. 2001; Online Reporter, n270, p N/A; dialog copy p. 1.*

* cited by examiner

*Primary Examiner*—Thomas A. Dixon

(57) ABSTRACT

A method for generating, providing, and utilizing time controlled date sensitive pre-paid postage on an item to be delivered, including a desired delivery amount and personalized postage mark, with the intention of causing action prior to a chosen date. An Issuer would send prepaid postage to a Recipient with a chosen effective date and a chosen expiration date. Said effective date and expiration date would allow Issuer to encourage Recipients to initiate action within a predetermined time window. After effective expiration date, postage would expire requiring new postage/delivery fees to be added to the item for it to be mailed/delivered.

19 Claims, 4 Drawing Sheets

TIME CONTROLLED PRE-PAID DELIVERY

BACKGROUND OF INVENTION

In today's environment where consumers and companies are deluged with mail that includes bills, special offers, rebates, incentive programs, subscriptions, membership dues, charitable organizations, invitations, catalogs, coupons, and many other pieces, it has become more and more difficult to get responses from recipients. Additionally when recipients do respond it takes a longer time for them to perform a response. One common tactic that companies have used is prepaid postage or Business Reply Mail offered by the United States Postal Service. Business Reply Mail allows companies and individuals to pay the cost of delivery for responses that are received. Generally, prepaid postage effectuates greater response rates from recipients. With prepaid postage, recipients are saved the step of affixing postage to an envelope. But even with prepaid postage there is no urgency created and accordingly no guaranteed increase in actual response time. Prepaid postage does not engender a sense of urgency or action with the recipient. Recipients know that they can use the prepaid postage at any time, and respond at their leisure, and the postage will still be paid. Accordingly, prepaid postage merely facilitates action, but does not create or cause action.

Additionally in the case of Business Reply Mail, it has no expiration, and will be forwarded to the company at any location in the country as long as the Business has an active account with the Postal Service. Conceivably a company could offer a special unique promotion and receive a reply card or envelope 5 years later. The promotion may have been long over and no longer relevant, yet they would be obligated to receive said items and pay said postage.

With package delivery companies, such as FedEx, Airborne Express, UPS, and others, the method presently offered to prompt a quick response with customers is to schedule a pick-up for them. In these instances, for example, a customer may wish to return an item purchased. The customer contacts the company, who agrees to take the return, and the company in turn contacts the delivery company to schedule a pick-up. The delivery company then contacts the customer to schedule a pick-up. This requires many unnecessary steps for both the customer and the company. It requires the company to staff additional customer service representatives, it requires the delivery company to have additional customer service representatives, and it requires the customer to deal with all of them. It also does not effectuate any time controlled prepaid delivery with a predetermined effective expiration date.

Another instance where the system creates problems is in the case of prepaid returns by catalog companies. For example many catalog companies will agree to pay the delivery cost of returns. Accordingly they send the customer a prepaid delivery slip, and the customer then uses that slip to send off the package. The longer it takes the customer to send the item back to the company, the longer it takes to get that item back into circulation, and ultimately the longer it takes to make the sale. This is because prepaid delivery slips do not have any form of expiration date. These delivery slips are all open ended, and accordingly can be utilized by a customer at any time.

Companies and individuals will always need to improve customer's response times. With improved response times, companies and individuals can gauge effectiveness of advertising, the quality and appropriateness of a targeted demographic profile, improve cash flow, increase dialogue with the recipient, improve planning and preparation, facilitate company growth, etc. Clearly, increasing response rates of groups and individuals would provide enormous benefits to those groups issuing the item for response.

BRIEF DESCRIPTION OF FIGURES

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner

DETAILED DESCRIPTION OF INVENTION

Figure 1:
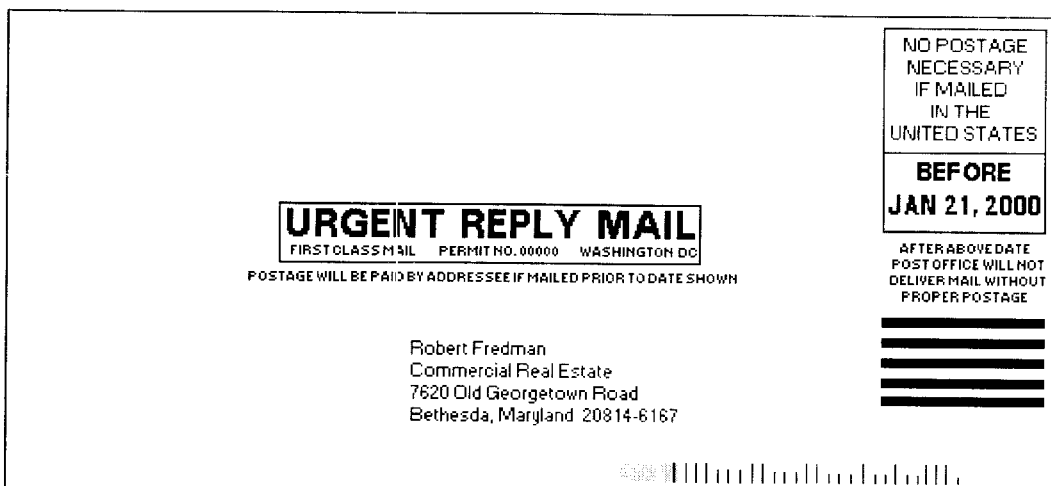
FIG. 1 shows a representation of a proposed "Urgent Reply Mail" envelope with a predetermined effective expiration date. "Urgent Reply Mail" is a term created for descriptive and clarification of this method. Said representation could also be used for a card as well.
Figure 2:
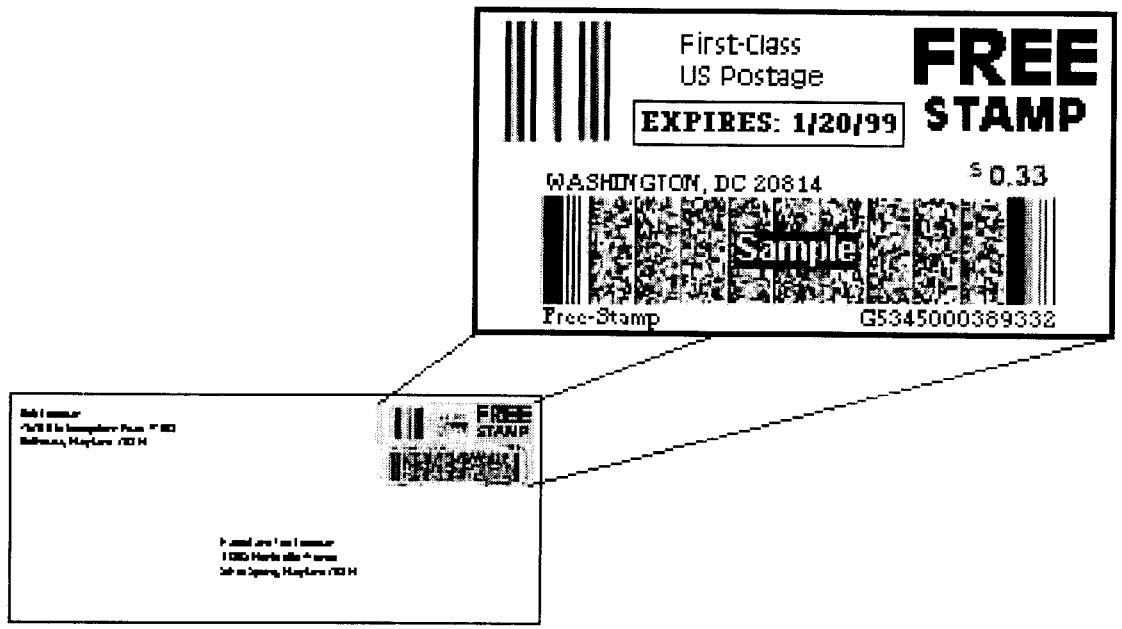
FIG. 2 shows a representation of a Stamp/postage with a predetermined effective expiration date. Said stamp could be affixed on an envelope, card, box, tube, pak, or other method of delivery.
Figure 3:
FIG. 3 shows a representation of a shipping label used by a Delivery company with a predetermined effective expiration date. Said label could be affixed on an envelope, card, box, tube, pak, or other method of delivery.
Figure 4:
FIG. 4 shows a representation of a "Date Sensitive Mail" envelope with a predetermined effective start date and a predetermined effective expiration date.

In order to solve the above referenced and related problems, I have proposed to create a method of prepaid postage/delivery with an expiration date. This expiration date would prove an important incentive to facilitate and increase a Recipient's rate of response. Time Controlled Prepaid Delivery with an issuer defined predetermined effective expiration date will provide many benefits to Issuers. It will improve customer response time, company cash flow, and the general likelihood of a recipient's response. It will also be perceived by the Recipient as a benefit and convenient service.

The most commonly used prepaid delivery system currently in use is Business Reply Mail offered by the United States Postal Service. As discussed earlier there is no expiration date for Business Reply Mail, accordingly there is no cost benefit for many Companies to provide this particular service to their regular bill paying customers. These customers are already obligated to pay their monthly bills to these companies. Accordingly, for companies to provide Business Reply Mail in its current form to customers would only add additional cost to the company's bottom line.

With the Time Controlled Prepaid Delivery service that I propose, companies could choose based upon a cost-benefit analysis, whether of not to offer the benefit of time controlled prepaid postage/delivery to their customers. For companies that provide such service, their customers could choose whether or not to take advantage of prepaid postage and send an item prior to its postage's predetermined expiration date or to send the item after the predetermined effective expiration date and pay for postage themselves.

By providing this service to its customers, companies would not only be providing additional benefit to its customers, but would receive substantial financial benefits as well. By example, the following chart shows increased revenue for a number of large potential Issuers. These calculations are based upon a rate to Issuer of $0.35 per envelope, which is consistent with the USPS charge for Qualified Business Reply Mail. The chart shows the Increased revenue based upon specific Issuers, number of customers, average daily balance, number of yearly payments, improved payment time, and value of money.

| Issuer | # of customers/ members | Avg. Balance due by customer | # of payments in a year | Improved payment time | Value of money | Annual increased revenue |
|---|---|---|---|---|---|---|
| Credit Card Company | 500,000 | $400.00 | 12 | 7 days | 8% | $1,580,880.00 |
| Auto Finance Co. | 350,000 | $450.00 | 12 | 7 days | 8% | $1,428,693.00 |
| Insurance Company | 750,000 | $500.00 | 2 | 7 days | 8% | $625,275.00 |
| Auto Insurance | 800,000 | $375.00 | 2 | 10 days | 8% | $754,600.00 |
| Mortgage Company | 600,000 | $1,000.00 | 12 | 7 days | 8% | $8,522,640.00 |
| Membership organization | 50,000 | $750.00 | 1 | 15 days | 8% | $105,743.75 |
| Telephone Company | 250,000 | $200.00 | 12 | 10 days | 8% | $264,600.00 |

It should be clearly noted that the vast majority of companies that would benefit from Time Controlled Prepaid Delivery do not currently provide customers with any form of prepaid Business Reply Mail. Specific examples include Credit Card companies, Finance companies, mortgage companies, utility companies, insurance companies, professional services, membership groups, service companies, and others. Accordingly, there is a tremendous untapped market of revenue for the US Postal Service. At current rates charged for the most comprehensive service, Qualified Business Reply Mail, the USPS could be increasing revenues by $0.02 per item delivered via this method, and by as much as $0.30 per letter for Basic Business Reply mail.

As stated earlier, many companies do not utilize Business Reply Mail because of its lack of timeliness, effectiveness, and unending potential charges, but would likely use a Time Controlled Prepaid Delivery service. These instances would include; Credit Card bills, Credit Card solicitations, Subscription services, Contests, Sweepstakes, Special offers, Coupons, Charitable Organizations, Membership groups, Finance companies, Banks, Professional companies (ie. Doctors, Lawyers, Accountants), Service Companies (ie. Plumbers, Electricians, Home Improvement Companies), etc. Time Controlled Prepaid Delivery Service would be a valuable and useful service to any company or individual that wishes to improve cash flow, speed of response, and effectiveness of advertising Time Controlled Prepaid Delivery could be issued as a 1-day service, 2-day service, 3-day service, 4-day service, 5-day service, 6-day service, 7-day service, 8-day service, 9-day service, 10-day service, 11-day service, 12-day service, 13-day service, 14-day service, 15-day service, 16-day service, 17-day service, 18-day service, 19-day service, 20-day service, 21-day service, 22-day service, 23-day service, 24-day service, 25-day service, 26-day service, 27-day service, 28-day service, 29-day service, 30-day service. It could be issued as a 1 month service, 2 month service, 3 month service, 4 month service, 5 month service, 6 month service, 7 month service, 8 month service, 9 month service, 10 month service, 11 month service, and 12 month service. It could also be issued in any combination of the above referenced or longer.

Time Controlled Prepaid Delivery could also be offered on a graduated reduction scale in any chosen combination of payment. Wherein for example a Company could agree to pay the full postage up until a predetermined date and half the postage until a predetermined date, a quarter of the postage up until a predetermined date, and none of the postage after a predetermined date. A clear example of this may be a company that has delivered a very expensive item to deliver. For instance it may cost a company $2,000.00 to deliver an expensive motorcycle. They could agree to pay the full $2,000 return delivery charges for 10 days following receipt. After 17 days they could offer to pay half of the return delivery charges, after 25 days they could offer to pay a quarter of the return delivery charges, and after 30 days they could offer to pay none of the delivery charges.

There also could be a variation wherein a company pays the entire amount regardless of when the item delivers, but charges back the customer's account based upon the date of delivery.

By example a Plumber could utilize a Time controlled prepaid delivery as follows. He could check his records and determine that on average his customers pay their bills 15 days following their receipt of a bill. With Time Controlled Prepaid Delivery, that plumber could offer his customers prepaid postage if they pay their bills 7 days following receipt. The plumber would go to the post office, or apply through some other method as offered by the post office at that time (ie. Internet, 1-800 number), and get an annual, or monthly, or daily "Urgent Reply Mail" permit (or some other name for Time Controlled Prepaid Delivery as determined by the Post Office). Once the account was opened with the Post Office, the plumber could preprint envelopes through a company or use an in-house computer program or other method to preprint envelopes. These envelopes would include his permit number, postage paid line, Postnet Bar code, Postage Endorsement Indicia, Facing Identification Mark, Horizontal Bars, mailing address, and other information, as required by the Post office at that time. He would send the preprinted envelopes to his customers with the chosen predetermined effective expiration date prominently printed on them. He would print this expiration date with a computer, or use a special date stamp, or through some other method. The date would also likely be encoded in a barcode on the envelope, so that it would automatically be read by the Post Office's mail processing machines and automatically charged to his account. Then, when the customers receive their bills, they could choose to either send their payment in the mail prior to the predetermined effective expiration date, or they could affix a stamp to the envelope and pay for it themselves after the predetermined effective expiration date. The Post office would bill the plumber's account for every envelope that was mailed prior to the predetermined effective expiration date. The post office may offer, at the plumber's option, the ability to pay for all postage of items sent without postage regardless of the date stamped on the mail. This would be encoded in the barcode, but would not be evident to the consumer. The reason the plumber may choose this option is to encourage a faster response, yet ensure the delivery for items mailed after the predetermined effective expiration date and without proper postage affixed. The plumber may even send a charge-back to the customer for the cost of postage if an item was sent after the predetermined effective expiration date without postage affixed. The use of the Time Controlled Prepaid Delivery system would provide the plumber with a method to expedite payments, improve company cash flow, and in most cases would not cost the plumber in instances where customers chose to pay after the prepaid postage offer.

Another example may include a Landlord or Mortgage company. Many states allow tenants and Mortgagees to make rent and Mortgage payments as late as the tenth day of each month without a penalty. A Landlord or Mortgage company could determine that it would be beneficial to pay for its customers postage on monthly payments that were mailed within the first 6 days of each month. Since their customers make payments every month, the companies could either send to their customers a bill each month with a preprinted prepaid envelope, or provide their customers with 12 preprinted envelopes for the year in a coupon book like format. In the coupon book like format, there may be a bill for each month and there would be an envelope for each month that would have a predetermined effective start date at the beginning of a month and a predetermined effective expiration date of 6 days later. For example there would be an envelope that had a predetermined effective start date of Jan. 1, 2001 and a predetermined effective expiration date of Jan. 6, 2001. The next envelope would have a predetermined effective start date of Feb. 1, 2001 and a predetermined effective expiration date of Feb. 6, 2001. The next envelope would have a predetermined effective start date of Mar. 1, 2001 and a predetermined effective expiration date of Mar. 6, 2001, and so on. By having a predetermined effective start date, customers could not merely use a later envelope when mailing a payment after the 5th day of the month. The companies would follow the same steps as the plumber listed above for getting such a permit from the Post Office. After getting this special permit, and using it on said envelopes, the company would only be billed for envelopes that were mailed following the predetermined effective start date and prior to the predetermined effective expiration date, unless they chose otherwise.

Another example may include a Credit Card Company. Using the example shown in the chart above, a credit card company could check their records for customers that have an average balance of over $400.00 per month, pay their bills in full every month, and after 15 days. Since the credit card company is not making any money on finance charges with these customers, and they are effectively extending an additional 15 days of credit, they could encourage these customers to send their payment 8 days earlier with Time Controlled Prepaid Delivery. By providing prepaid postage with a predetermined effective expiration date of 7 days after receiving the bill, customers would be required to pay their bills 8 days earlier to take advantage of free postage. For those customers that choose not to take advantage of free postage, the customer would have to affix postage, and there would be no charge to the Credit Card Company, other than the cost of printing the envelopes. Depending upon the interest rate, this earlier receipt of payment may only be worth 50 cents per customer to the credit card company, but multiplied by 12 months and several hundred thousand customers, and the value quickly adds up.

Time Controlled Prepaid Delivery could also be extremely beneficial for companies running special limited time offers. This may include special credit card offers, subscription services, discounts, coupons, and any kind of date sensitive, limited time offer. By including a predetermined effective expiration date, these companies would eliminate the chance of receiving responses to their offer months or years after the promotion has expired. By example EZ Credit Card company is offering a fixed 2.9% interest rate credit card. The special offer is only good for 60 days, to allow for potential changes in the Prime Lending Rate. EZ Credit Card usually would send out a mass mailer with Business Reply Mail envelopes inside. They found that they would get responses on average within 30 days, and as late as 2 years after the promotion would be offered. Unfortunately they were still obligated to pay the Post Office for delivery of these worthless responses. With the proposed "Urgent Mail" or Time Controlled Prepaid Delivery they could encourage customers to respond within 15 days cutting their response time in half, and not have to worry about responses after the 15 day deadline.

Time Controlled Prepaid Delivery could also be extremely beneficial to a membership organizations. Membership organizations often have difficulties receiving timely membership payments. With Time Controlled Prepaid Delivery, membership organizations could provide customers with prepaid predetermined effective expiration dated envelopes. They may offer their members to pay their membership within 15 days and receive free postage. These envelopes could be enough of an incentive for some members to pay dues and other fees sooner to these organizations. In the event customers do not make payments sooner, there would be no charge to the membership organization for offering this benefit to members.

Another example may be a Homeowners Association. Many Homeowners associations require its members to vote on different issues affecting the community. Generally these associations require a certain number of members to send in their votes to have a "quorum". As a result they are often required to send their members self addressed stamped envelopes or utilize some form of business reply mail. In these instances votes must be received prior to a chosen end date. With business reply mail the Homeowners Association is obligated to pay the postage for these envelopes or reply cards as long as they have an account open with the Post office. With stamped envelopes, they have to make an upfront payment regardless of whether or not members send in their votes. The best solution to this problem is Time controlled prepaid delivery. With Time Controlled Prepaid Delivery, the association could send out vote cards that would expire after a certain date. This would save them the cost of wasted postage, and save them the risk of paying for delivery after an appropriate date.

As stated earlier, Private delivery services, such as Fedex, Airborne, UPS, etc., currently have no method or system for consumers or companies to prepay delivery with a predetermined effective expiration date. This could be extremely useful in a number of cases. For companies that offer "no hassle returns" within 30 days, they could provide a prepaid delivery label to customers with a 30 day effective expiration date in order to effectuate a return by that date. This could also apply when customers request a return, and the company agrees to pay the delivery fees for it as long as the delivery is performed prior to a certain date. Companies would set up an account with their delivery company and would only be charged for deliveries that occurred prior to the effective expiration date. Companies may also choose to offer the customers the flexibility of a return within 30 days, but only provide prepaid delivery for 15 days. This would effectuate a quicker response time, which would allow the company to ultimately sell the item quicker.

Another example may be a Compact Disc club that offers a Compact Disc of the month with a 30 day free trial inspection. They may choose to provide their customers the convenience of a prepaid delivery label for returns within 15 days. The reason they may choose 15 days is because they will still be offering the 30 day free trial inspection, but if they can encourage returns to occur earlier, they can then send the Compact Disc back into circulation quicker and ultimately sell it quicker.

Another example may be a Catalog company that already offers free shipping on returns for all items. They can include a pre-addressed prepaid label within the delivery. This would be perceived by customers as above average customer service, and would eliminate excess administration needed to process returns. And by providing a predetermined effective expiration dated delivery to its customers, it controls when the returns take place, and encourage those returns earlier. Encouraging quicker returns, improves merchandise circulation and ultimately improves the sales cycle.

Ultimately it becomes a cost calculation per Issuer as to what instances prepaying postage/delivery is valuable. This new method that I propose, when utilized to its full potential, will have a tremendous impact on companies of all sizes and industries. It will positively effect the United States economy by improving response times, making companies more profitable, lower prices, and improve customers experiences. It may likely prove to be one of the most important new methods to improve delivery and mail services in the United States and the World.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of time controlled prepaid delivery in which an issuer provides prepaid date sensitive postage to a recipient in order to expedite the sending of an item by the recipient to the issuer comprising the steps of:
   a) making a postage mark which mark is prepaid with at least one of: a predetermined effective expiration date and a predetermined effective starting date or a predetermined effective expiration date without a predetermined effective starting date or a predetermined effective starting date without a predetermined effective expiration date wherein the predetermined effective starting date or predetermined effective expiration date may be flexible to permit earlier or later delivery actions for a fee charged by issuer to recipient;
   b) affixing or printing of the postage mark, with said data, on the item to be delivered; and
   c) time controlling the prepaid delivery of the item to be delivered from the recipient to the issuer based of said printed data.

2. A method according to claim 1 wherein said postage mark is a mark selected from the group consisting of: a stamp, a meter mark from a postal meter, an electronic stamp, electronically generated stamp, an internet stamp, a label, an adhesive stamp, a design preprinted on an envelope, or a design preprinted on a card.

3. A method according to claim 1 wherein the method is used for a product selected from the group consisting of: rebates, coupons, catalogs, advertising, bill payment, payment coupon books, rent payments, utility payments, mortgage payments, credit card payments, subscriptions, memberships, renewals, surveys, polls, questionnaires, forms, package delivery, product returns, package returns, votes, or applications.

4. A method according to claim 1 wherein the mark is made to look like a mark selected from the group consisting of: a stamp, a logo, a label, an advertisement, a bar code, graphic, hologram, picture, photo, or art work.

5. A method according to claim 1 wherein the mark is placed on an envelope, label, post card, box, bag, form, slip, or piece of paper.

6. A method according to claim 1 wherein the mark is made by a computer, meter machine, stamp, printing machine, or copying machine.

7. A method according to claim 1 of distributing the prepaid postage by the issuer to the recipient in which the prepaid postage entitles the recipient to send an item for delivery via a delivery service;
   i. wherein prepaid predetermined effective starting date postage would be for a limited time with the predetermined effective starting date determined by issuer;
   ii. wherein prepaid predetermined effective expiration dated delivery would have a defined expiration date determined by issuer.

8. A method according to claim 1 wherein the predetermined effective starting date and the predetermined effective expiration date are emphasized.

9. A method according to claim 6 wherein the predetermined effective starting date and the predetermined effective expiration date are emphasized through causing the typeface to be bold, highlighted, bordered, colored, background or italicized.

10. A method according to claim 1 wherein the method further comprises the step of a graduated reduction in the level of postage paid by the issuer for the item to be delivered with the reduction occurring over a selected period of time.

11. A method according to claim 1 wherein the method further comprises that after the predetermined effective expiration date a charge for the postage can be charged by the issuer to an account of the recipient.

12. A method according to claim 1 wherein the Issuer selected from the group consisting of: credit card companies, landlords, utility companies, mortgage companies, banks, finance companies, retailers, catalog companies, internet companies, membership organizations, service companies, professional companies, or associations.

13. A method according to claim 1 wherein the issuer utilizes a computer database to target recipients to obtain maximum cost effectiveness of issuing date sensitive postage.

14. A method according to claim 1 wherein the issuer creates a period of prepaid postage between predetermined effective starting date and predetermined effective expiration date wherein Recipient can utilize postage;
   wherein recipient would have the benefit of postage paid for an item sent following predetermined effective starting date and prior to the predetermined effective expiration date.

15. A method according to claim 1, wherein the issuer would pay the delivery fees due to the United State Postal Service for such a service in response to the recipient opting to use the prepaid postage following predetermined effective starting date and prior to the predetermined effective expiration date.

16. A method according to claim 1 wherein said postage mark is a personalized mark selected from the group consisting of: a company logo, graphic, image, art design, trademark, service mark or photographs.

17. A method according to claim 1 wherein said prepaid time sensitive postage mark is a used for the purposes selected from the group consisting of: special coupons, mail in rebates, catalog returns, refunds, promotional material, advertising, sponsoring charities, coupon books, membership payments, regular bill payment, RSVP, information requests, promotions, eliminate the threat of reuse of prepaid postage, or subscription offers.

18. A method according to claim 1 wherein the method further comprises allowing recipients to use an envelope after the predetermined effective expiration date by affixing the correct postage to the item to be delivered.

19. A method according to claim 1 wherein the method further comprises allowing the date sensitive information of predetermined effective expiration date and predetermined effective starting date to be electronically represented in bar-coding adjacent to or included in the label wherein the bar coding would be readable by the post office and would allow the post office to tell if postage was expired.

* * * * *